United States Patent [19]

Ares et al.

[11] Patent Number: 5,826,443
[45] Date of Patent: Oct. 27, 1998

[54] HEAT PUMP WITH HEAT-PIPE ENHANCEMENT AND WITH PRIMARY SYSTEM REHEAT

[76] Inventors: Roland Ares, 1004 Wedgewood, St. Charles, Mo. 63303; Ness Lakdawala, 4300 Poirer Blvd., Montreal, Quebec, Canada, H4R 2C5

[21] Appl. No.: 986,289

[22] Filed: Dec. 6, 1997

[51] Int. Cl.⁶ .................................................. F25B 13/00
[52] U.S. Cl. ............................ 62/324.1; 62/335; 62/513; 165/66
[58] Field of Search .................................. 62/90, 93, 94, 62/271, 335, 513, 404, 407, 408, 422, 324.1, 406; 165/109.21, 66, 104.11

[56] References Cited

U.S. PATENT DOCUMENTS

| | | | |
|---|---|---|---|
| 3,640,090 | 2/1972 | Ares | 62/406 |
| 4,711,094 | 12/1987 | Ares | 62/90 |
| 5,551,245 | 9/1996 | Calton et al. | 62/90 |
| 5,761,923 | 6/1998 | Maeda et al. | 62/271 |

*Primary Examiner*—John M. Sollecito
*Attorney, Agent, or Firm*—Daniel Kramer

[57] ABSTRACT

For a supermarket having open refrigerated food display cases and adjacent cold isles and having primary refrigeration systems for refrigerating the cases, energy efficient ventilating means for removing the cold air from the isles and supplying replacement conditioned dehumidified air. The ventilating means includes heat pipes for utilizing the cooling effect of the cold leaving air removed from the isles to precool warm outside make-up air and a reversible refrigerating system for further cooling and dehumidifying the precooled outside air. Excess heat available from the primary market refrigerating system is employed to heat or reheat the dehumidified but now cold outdoor make-up air prior to its entry into the market.

14 Claims, 3 Drawing Sheets

HEAT PUMP WITH HEAT-PIPE ENHANCEMENT AND WITH PRIMARY SYSTEM REHEAT

FIELD OF THE INVENTION

The invention relates to refrigeration systems and especially to reversible refrigeration systems known as heat pumps which have interchangeable cooling coils (evaporators) and heating coils (condensers).

The invention further relates to such reversible systems which are arranged to simultaneously affect parallel air streams, one air stream traversing the then evaporator, the other traversing the then condenser whereby air flowing through the condenser is heated and air flowing through the evaporator is cooled and dehumidified.

The invention further relates to heat pipe assemblies arranged with respect to the cooling and heating coils to abstract heat from and thereby precool warm air flowing to the evaporator/cooling coil and transfer the abstracted heat to the cool air flowing to the condenser/heating coil.

The invention further relates to means for reheating the cooled dehumidified air flowing from the cooling coil.

The invention further relates to the application of such reversible refrigerating systems to supermarkets having uncomfortably cold air in the isles adjacent open refrigerated food display fixtures, and for removing such cold air and replacing the cold air with warmed fresh dehumidified make-up air, and especially to such applications where the airstreams are entirely above grade.

The invention further relates to such supermarkets employing central refrigerating systems having evaporators and heat dissipating condensers to refrigerate such open display fixtures and for other purposes.

The invention further relates to the use of controlled amounts of the heat normally rejected by said central system condensers for heating or reheating the precooled, cooled and dehumidified fresh make-up air discharged by the evaporator of the reversible system.

BACKGROUND: PRIOR ART

Ares U.S. Pat. No. 4,711,094 teaches a heat pump system having two reversing valves to control the usage of an indoor auxiliary coil employed in conjunction with a main condenser. One usage during summer is to obtain subcooling of the refrigerant leaving the main condenser. A second usage is as a condenser to provide additional heating effect during winter periods. Ares U.S. Pat. No. 3,640,090 teaches the use of a heat pipe heat exchanger to augment heat recovery performance from a non-reversible refrigerating system employed to abstract heat from a ventilation airstream and transfer the abstracted heat to a makeup airstream.

BACKGROUND OF THE INVENTION

Many supermarkets have open display cases for the display of fresh and frozen food. Most employ large primary or central refrigeration systems for cooling said cases and for air conditioning and other purposes. The air in the isles adjacent to such fixtures or cases is frequently so cold as to make shoppers and, especially during summer or hot weather periods, lightly clad female or male shoppers, uncomfortable. When the shoppers are uncomfortable they tend to spend less time in the uncomfortably cold environment and therefore do less impulse buying, to the detriment of the store sales volume.

Further, local and national rules applying to more and more places of public occupancy require high rates of fresh make-up air to be introduced for ventilation purposes. In summer the cost of cooling and dehumidifying hot outdoor air employed for make-up air for ventilation and in winter the cost of heating the cold outdoor air used for make-up air for ventilation is high.

The current invention addresses indoor air quality and the high energy cost for heating and cooling the ventilation make-up air. The invention teaches a heat pipe and heat pump combination, coupled with the use of free added heat from the store central refrigeration system.

Currently supermarkets attempt to mitigate cold isle conditions by withdrawing cold air from the isles adjacent the open refrigerated cases and channeling the withdrawn cold air through sub-floor concrete trenches employed as ducts for conveying the cold withdrawn air back to the air inlet of the central store air conditioner (return air). These concrete air return ducts in the floor also are frequently employed as convenient locations for the refrigerant piping employed for providing refrigeration to the refrigerated cases. The concrete below grade ducts are frequently subject to floor dirt and to mold and bacteria growth on the concrete duct walls. The molds may generate allergenic spores as part of their reproductive life cycles and the bacterial may or may not be health threatening. This below grade environment for the return air establishes a high likelihood the return air conveyed in such below grade trench ducts may become contaminated with airborne bacteria and molds and life-cycle products of mold growth. The cool damp return air from the floor ducts is mixed with other air returned from other store locations and with a percentage of outside ventilating or makeup air. The primary store air conditioner chills and dehumidifies the mixture of recirculated store and makeup air. The bulk of the chilled and dehumidified conditioned air is discharged into the high-load high-people-concentration store-front area adjacent the entrances and check-out counters in order to offset infiltration of warm air through store entrances and exits, the high people load, and provide to the waiting shopper a sense of comfort and well-being during this period.

The cooled dehumidified air discharged at the front of the store flows through the store, back to the aisles adjacent the open refrigerated display fixtures. By the time the conditioned air has reached the cases, the air has picked up a relatively high moisture load from infiltration, customers' breath and bodies and from the moisture laden vegetable displays. The moist conditioned air is then cooled to a temperature uncomfortable for shoppers by air spillage from the refrigerated open cases.

This cold moist air, prior to being withdrawn into the below grade trench ducts, inevitably infiltrates into the open refrigerated display cases, thereby adding to the frost load deposited on the refrigerating coils in the cases and shortening the periods between required defrosts. Frost on refrigerating coils acts both as an insulator and as a blockage to air flow. Both these actions of the frost reduce the cooling capacity of the cooling coil and increase the cost to secure the low product temperatures required by codes and regulations. To cope with the frost deposited on the coils, manufacturers provide mechanisms for periodically stopping the refrigeration and heating the coils above the thaw point to thaw the frost and allow it to run as water into a drain. Frequent defrosts are costly in several ways. First they require heat input, generally from electric heaters which impose an electricity cost. Second they tend to warm and thereby degrade the displayed product, thereby shortening the shelf life of the product. Third the increased temperature of the product and of the coil and case itself immediately following defrost increases the refrigeration load and consequently both the electrical consumption and the related cost of running the refrigerating equipment.

The source of most of the moisture that deposits on the refrigerating coil is moisture in the air which has been drawn into the circulating airstream of the refrigerated display fixture. Therefore any step which reduced the concentration of moisture in the air surrounding the fixture would reduce the rate at which moisture deposited on the refrigerating coils and extend the time between defrosts.

The present invention addresses, under both summer and winter outdoor conditions, the dual problem of too-cold isles and too-humid air in the vicinity of the open refrigerated display cases and simultaneously the problem of air contamination by flow through the below grade trenches, channels or ducts.

SUMMARY OF THE INVENTION

For a supermarket residing in an outdoor ambient air environment, a primary refrigerating system for cooling open and closed food storage and display fixtures and cases within the store or market. The market has isles adjacent the open refrigerated food display cases and the isles are filled with cold humid air which has leaked or spilled out of the cold display cases. The invention comprises power efficient means for removing or purging the cold humid air from the isles via an above-grade duct and replacing said air with dry warm fresh air supplied through an above grade duct.

The means includes a first airstream flowing from the outdoors to an isle area, a second airstream flowing in a path substantially parallel to the first airstream from said isle area to the outdoors.

The means further includes a reversible refrigerating means having a summer mode and a winter mode. The refrigerating means has a first coil positioned in the first airstream and a second coil positioned in the second airstream. In the summer mode the first coil acts as evaporator means for cooling the fresh make-up air passing therethrough from the outdoors to the isle. The second coil acts as condenser means for heating air passing through from the isle enroute to the outdoors and thereby condensing refrigerant traversing the coil.

The means further includes heat pipe means having a first section positioned in the first airstream and a second section positioned in the second airstream for transferring heat from the warmer airstream to the cooler airstream. The first section is positioned on the air inlet side of the first coil and the second section is positioned on the air inlet side of said second coil. In this arrangement the heat pipe exchanger precools outside air flowing to said first coil functioning as evaporator means, thereby improving the dehumidifying effect of the first coil and simultaneously preheats the air flowing to the second coil functioning as condenser means.

The means further includes reheat condenser means positioned in the first airstream at the air outlet of the first coil for heating or reheating fresh make-up air discharged by said first coil. The reheat condenser means are connected to said primary refrigerating system for dissipating a portion of the heat generated by said primary system.

While the make-up air in the preferred construction is secured from an outdoor location, in other equivalent constructions the make-up air is secured from appropriate indoor locations.

BRIEF DESCRIPTION OF THE DRAWINGS

The foregoing summary as well as the following description of preferred embodiments of the invention, will be better understood when read in conjunction with the appended drawings. For the purpose of illustrating the invention there are shown in the drawings embodiments which are presently preferred, it being understood, however, that the invention is not limited to the specific instrumentalities or the precise arrangement of elements disclosed.

In FIG. 5 the element having a typical horizontal position and in FIG. 6 the element has an inclined position.

DETAILED DESCRIPTION OF THE INVENTION

Figure 1:
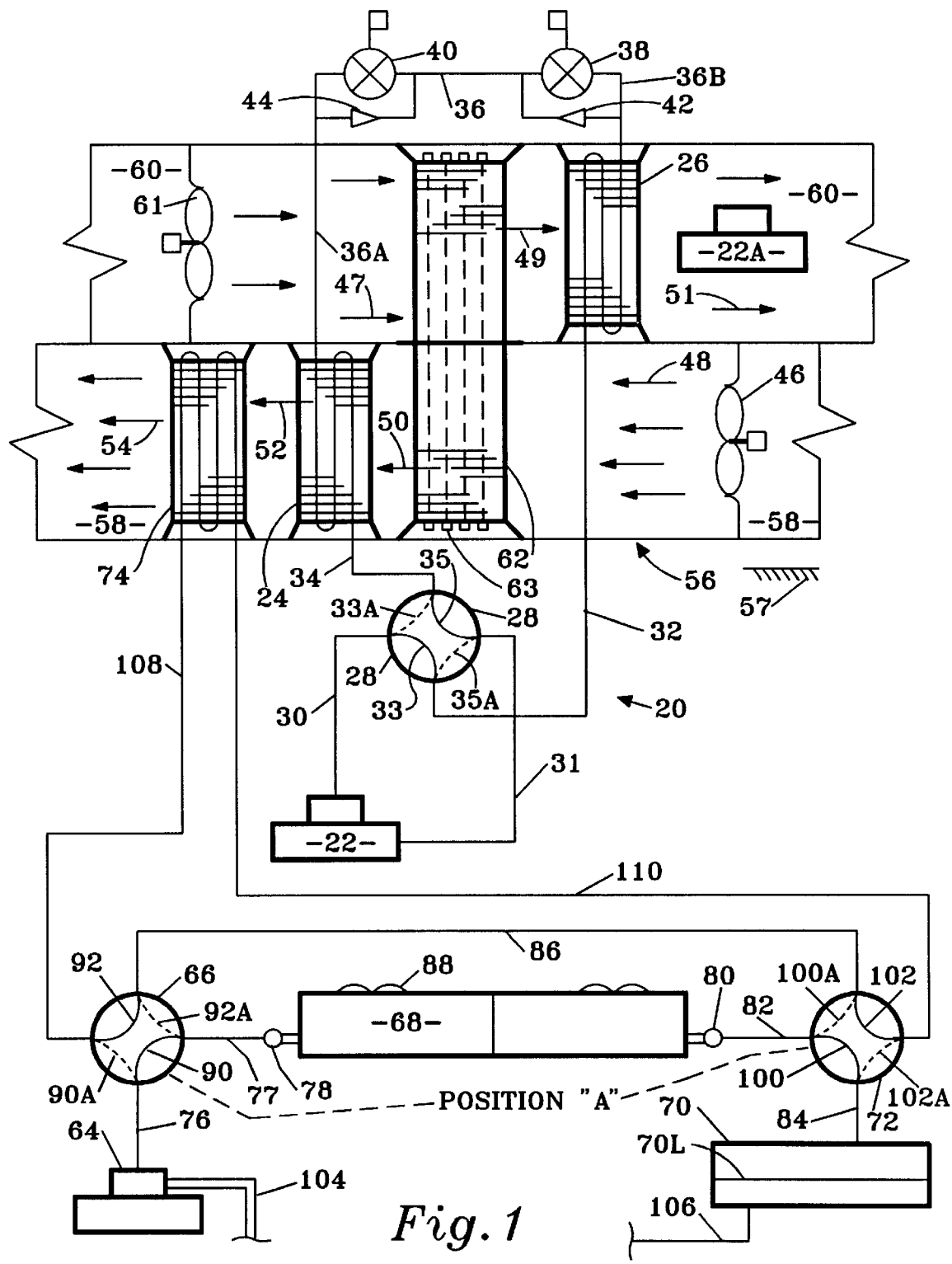
FIG. 1 is a schematic representation of a reversible air-conditioning system with heat pipe heat exchanger and a reheat coil associated with a primary refrigeration system.

Referring now to the drawings, wherein like references are used to indicate like elements, there is shown in FIG. 1 grade or floor level 57 and a dual above-grade air duct system 56 having substantially adjacent supply air duct 58 and exhaust air duct 60. Above grade supply air duct 58 receives outdoor air 48 and discharges conditioned air 54 to the isle adjacent the open refrigerated display fixtures (case isle, not shown). Above-grade exhaust air duct 60 removes cold humid air 47 from the case isle and discharges air 51 to the outdoors. In another equivalent construction, the conditioned air 54 is not discharged into the store isle but to another store location.

Fan 46 acts to move air 48, 54 through the supply duct 58 and fan 61 acts to move air 47, 51 through the exhaust air duct 60.

Within the two ducts are heat exchange coils 24 and 26. These coils form the heat exchange coils or elements of a reversible compression type refrigeration/air conditioning system 20. In a first mode (the cooling cycle or mode) element 24 acts as a cooling coil/evaporator while the other element 26 acts as a heating coil/condenser.

In a second mode (the heating mode) element 24 acts as a heating coil/condenser while the other element 26 acts as a cooling coil/evaporator.

The name of the mode or cycle refers to the action of the reversible system 20 on the outside airstream 48 as it flows through the various elements, toward the store interior via air stream 54 which has traversed the various elements. These actions or functions will be described.

In both the cooling and the heating mode, compressor 22 acts to withdraw refrigerant vapor via 4-way valve 28, from the coil heat exchange element then acting as the cooling coil/evaporator. This vapor flows to compressor 22 through its suction conduit or suction line 31. Compressor 22 compresses the refrigerant vapor and discharges the compressed hot refrigerant vapor into its discharge conduit 30. The compressed vapor then flows to the coil heat exchange element then acting as heat coil/condenser via 4-way valve 28. The system mode or cycle is determined by the position of the internal passages in 4-way valve 28. Though not shown, an electrical solenoid is usually employed to change the position of the internal passages.

In the cooling mode 4-way valve 28 has internal moveable passage 33 (solid line) positioned to connect compressor discharge line 30 to conduit 32. This conduit 32 conveys the high pressure hot discharge refrigerant vapor to coil element 26. In this (cooling) mode, coil element 26 then acts as condenser. The coil element 26 conveys the heat of condensation of the high pressure refrigerant vapor received from conduit 32 to the airstream 49 entering heat exchanger 26. In receiving this heat, airstream 49 is warmed to a higher temperature exhibited by airstream 51 leaving coil element 26. The high pressure refrigerant vapor which had entered coil element 26 via conduit 32, now leaves coil element 26 as a high pressure liquid refrigerant via conduit 36B.

Expansion valves are designed to allow metered refrigerant flow only toward the coil they serve. Expansion valve 40 serves coil 24. Expansion valve 38 serves coil 26. Since expansion valve 38 does not allow flow in its reverse direction, the refrigerant liquid leaving coil element 26 must flow to conduit 26 (liquid line) via check valve 42. Check valve 42 is designed and oriented to allow flow in the direction of its arrow and to prevent reverse flow.

The liquid refrigerant generated by coil element 26, acting as a condenser, cannot flow through check valve 44 since it, like its brother check valve 42, is oriented to allow flow toward liquid line conduit 36 and to prevent reverse flow. Consequently, the liquid refrigerant must flow through expansion valve 40 serving coil 24. Expansion valves act to reduce the pressure and therefore the temperature of the liquid refrigerant. The now cold low pressure refrigerant flows into coil element 24 (now acting as an evaporator or cooling coil) via conduit 36A. While traversing coil element 24 the cold liquid refrigerant abstracts heat from entering airstream 50 and simultaneously lowers the temperature of the airstream sufficiently to cause the moisture contained in entering airstream 50 to condense on the cold surfaces of coil element 24, thereby dehumidifying the airstream 50/52 flowing through it. The condensate (not shown) is collected in a drainpan and piped to a drain (not shown).

While the refrigerant which entered coil element 24 in this cooling mode was a liquid, now, having cooled the airstream 50/52 flowing through it and absorbed heat from that airstream, the refrigerant has now evaporated to a vapor. The vapor flows to 4-way valve 28 via conduit 34, through internal valve passage 35 (solid line) of 4-way valve 28 and back to compressor 22 via suction line 31, thereby completing the refrigeration cycle. As long as the compressor continues to operate, the refrigerant flows around and around the above described conduits. endlessly repeating the cooling cycle.

A heat pipe is simply a highly efficient very compact heat exchanger for exchanging heat between two adjacent fluid or air streams.

Heat pipe assembly 62 comprises a matrix of individually sealed tubes 63, each containing a volatile liquid and a cylindrical liner 65 of a porous or absorbent material. While a description of the construction of a heat pipe and a heat transfer assembly employing heat pipes is provided, the inventor does not claim any novelty in the construction of heat pipes employed in the invention.

Figure 4:
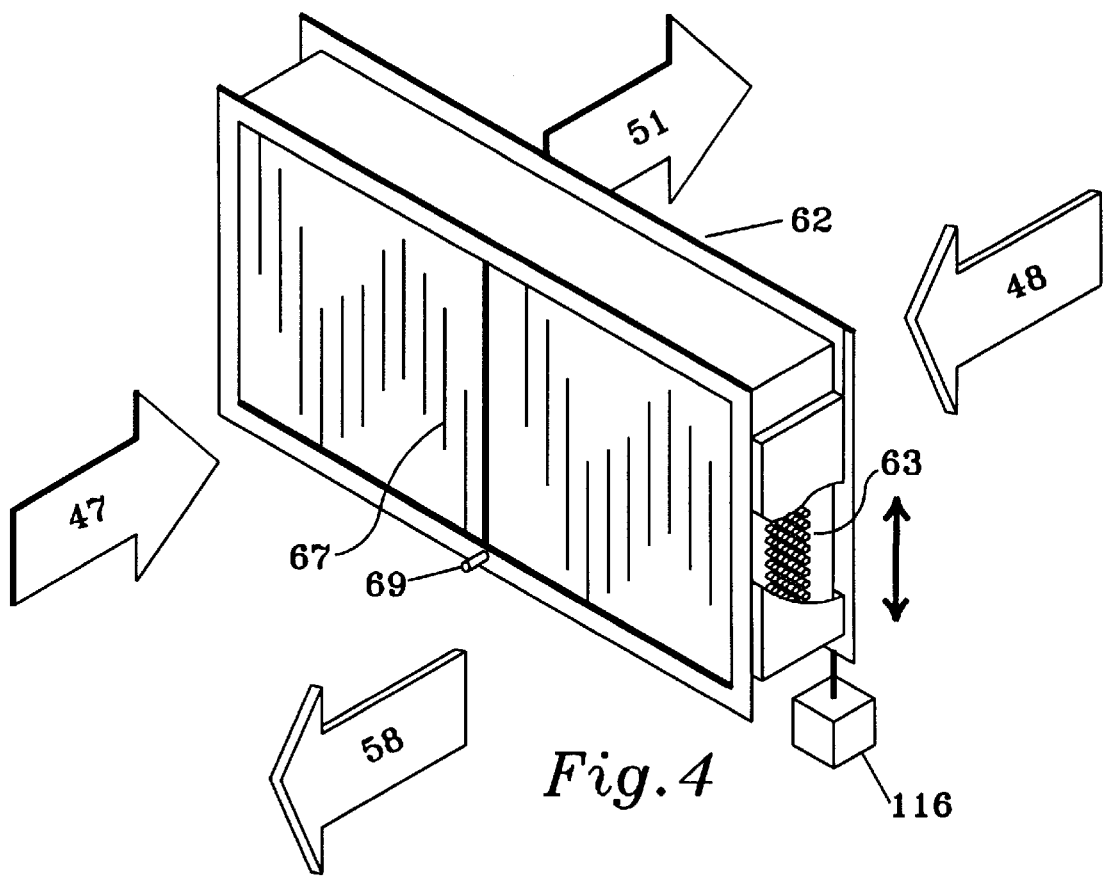
FIG. 4 shows an isometric view of the heat pipe heat exchanger including a pivot and a mechanism for inclining the heat exchanger for higher and lower heat transfer performance.
Figure 5:
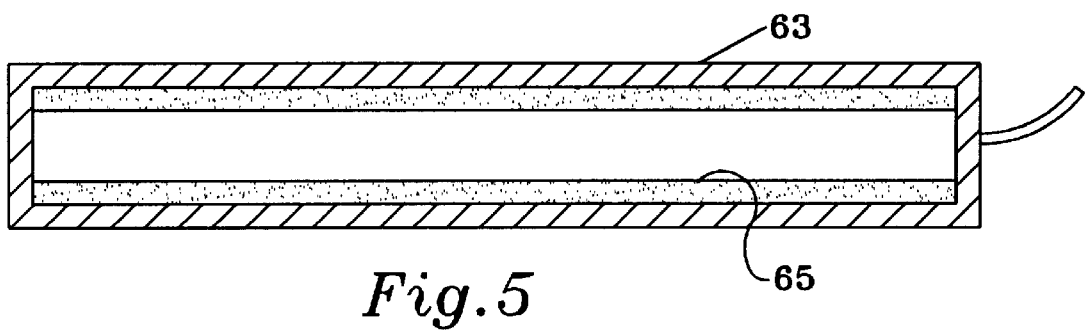
FIGS. 5 and 6 show a single heat pipe element.
Figure 6:
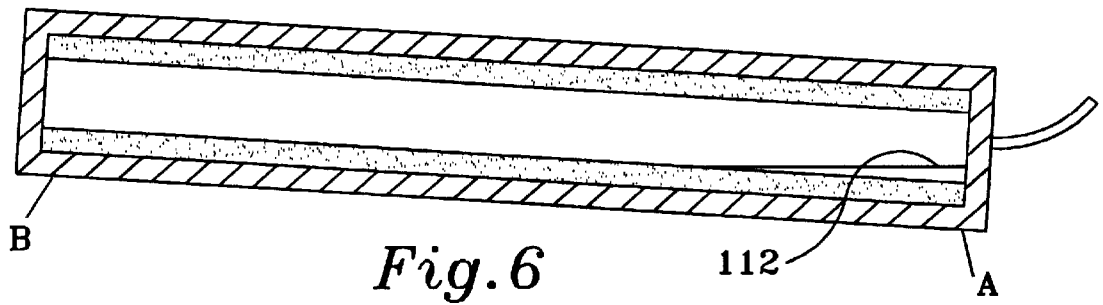

Referring now to FIG. 4, 5 and 6, there is shown in FIG. 4 an isometric view of the heat pipe coil assembly 62 alone, also identified as 62 in FIG. 1. Within the assembly resides a matrix of individual sealed tubes 63, cross sections of which are shown in FIGS. 5 and 6. The matrix of heat pipe tubes is embedded in a stack of spaced-apart fins 67 so that, from the entering or leaving air-faces, the assembly 62 is indistinguishable from an ordinary heat transfer coil such as 24 or 26 of FIG. 1.

In use the heat pipe assembly is installed in such a position that one portion is subject to a stream of warm gas 48; the other portion is exposed to a stream of cooler gas 47. In the instant application of the invention the warm gas stream and the cooler gas stream are almost always air or a solution of air and water vapors. The warm air stream 48, in traversing the matrix of heat pipe elements 63, boils off a volatile liquid 112, much of which has been absorbed into the porous layer 65 within the heat pipe element 63. The vapor, resulting from the boiling of the volatile liquid, flows through the interior open tubular channel within heat pipe 63 from the warmer portion, where it had been exposed to the warm air stream, toward and to the portion of the heat pipe exposed to the cooler air stream 47. There, within the cooler portion, the vapor condenses, thereby warming the cooler airstream traversing that portion of the heat pipe assembly.

The effect of removing heat from the higher pressure vapor inside the heat pipe element is to condense the vapor to a liquid. The liquid now must return to the warmed end to again be subject to warm airstream 48. It may do so by osmotic movement through the porous layer 65. This mode of liquid motion is slow and limits the capacity of each heat pipe element to transfer heat from its warm end to its cool end.

By contrast, if the heat pipe element 63 is tilted toward the warm end, as displayed in FIG. 6, liquid, condensed on the side B exposed to the cooler airstream, can flow by gravity downward and toward the right end A of heat pipe element 63. This flow regime allows much faster movement of the volatile liquid from end B to end A, sometimes resulting in a pool 112 of volatile liquid to appear and be subject to the heating and pressure raising effect of the warm airstream 48 thereby sharply increasing the ability of the heat pipe element to transfer heat from the portion exposed to the warmer airstream to the portion exposed to the cooler airstream.

Referring again to FIG. 4, there is shown linear actuator 116 which, on actuation by a control (not shown), can cause the heat pipe assembly 63 to rotate around pivot 69, thereby acting to increase or decrease the heat transfer effect of the heat pipe assembly 63 depending of the direction of the tilt. With the assembly end subject to the warm airstream higher than the assembly end subject to the cooler airstream, the heat transfer capacity will be low. By contrast, with the assembly end subject to the warm airstream lower than the assembly end subject to the cooler airstream, the heat transfer capacity of each heat pipe element 63 and therefor of the entire assembly 62 will be high. There is usually provided a flexible connector between the heat pipe assembly and its coordinate air ducts to allow the small degree of rotation needed to secure the control effect.

Though the two airstreams 48/58 and 47/51 are shown flowing in opposite directions or in counterflow, other arrangements have the warmer and cooler airstreams flowing in parallel, that is, in the same direction.

Referring again to FIG. 1, the effect of the system actuated by compressor 22 while valve 28 is in the cooling mode, together with the heat exchange function of the heat pipe assembly 62 is illustrated by the following figures. It should be noted that, while specific figures are provided for illustration, there is no intent to suggest that the specific figures or temperatures or heat pipe capacities will apply in any specific situation but that the general conditions only will apply.

For illustration there is assumed an air temperature in the cold isles adjacent the refrigerated open display cases of 65

F. and an outdoor temperature of 95 F., an inflowing airstream of 1000 cubic feet per minute (cfm) and an outflowing airstream of the same amount. The heat pipe assembly has a coefficient of heat transfer times surface area (UA) of 543 Btu/hr-F, where F is the mean temperature difference between the warm and cool airstreams.

Under these conditions the 95 F. outdoor air will be cooled to 85 F. and the 65 F. cool air from the isles will be warmed to 75 F. These temperature changes through the heat pipe heat exchangers allow the evaporator/cooling coil 24 to cool and dehumidify the moist outdoor air much more effectively and with lower horsepower than the same refrigerating system installed without a heat pipe or other heat exchanger. While the 10 F. reduction in the temperature of the air entering evaporator 24 has a substantial effect of the dehumidifying effect of evaporator 24, the 10 F. rise in the temperature of airstream 47 to airstream 49 entering the condenser coil 26 has a minimum negative effect on system capacity.

However, the increased dehumidification effectiveness of evaporator coil 24 when operating with its inlet air precooled by heat pipe assembly 62, has a negative side. That is the actual or dry-bulb temperature of the airstream 52 leaving evaporator coil 24, though effectively dehumidified, is very cold. Discharging this cold dry air into the store isles would aggravate the same problem the systems is intended to avoid.

It is clear that to supply external heat from an electrical or fossil source to reheat the cold air 52 discharged from evaporator coil 24 would significantly raise costs of operating the system, sharply reducing its desirability. However, by employing a portion of the heat from the store central refrigeration system, reheating the cold dry air produced by the heat pipe heat pump system becomes essentially free. Further, the air heating function has a potentially significant further energy cost saving feature. By utilizing the arrangement disclosed herein, the coil 74, positioned in the discharge airstream 52 from the heat pump evaporator can be utilized to cool the liquid refrigerant leaving the main system condenser 68, thereby significantly increasing the capacity of the main system.

Referring again to FIG. 1, there is shown main store compressor 64. While a single compressor is shown, it should be understood that there may be several compressors in parallel or in compound compression mode or connected to several different suction lines. The single or multiple compressors, referred to further only as compressor 64, discharge their hot compressed refrigerant vapor into discharge line 76; thence to 4-way reversing valve 66.

There are two 4-way reversing valves connected to control and direct the inflow, valve 66, and the outflow, valve 72, of refrigerant from main condenser 68. Each of these valves can operate in either a position "A" or a position "B".

FIG. 1 shows both valves in position A. First the operation of the system with the both valves in position A will be described. Then, by reference to FIGS. 2 and 3, the operation of the valves in other positions will be addressed and explained.

In FIG. 1 with the 4-way valves 68 and 72 both in the A position, the refrigerant flow from compressor/s 64 is into discharge line 76, through internal valve passage 90 in (discharge 4-way) valve 66; through condenser 68, out of condenser 68 by liquid manifold 80 and liquid line 82. The liquid from liquid line 82 follows internal passage 100 through (liquid) 4-way valve 72 and flows therefrom into receiver 70 by way of conduit 84. Liquid level 70L is maintained in receiver 70 and outflow of liquid refrigerant to main system evaporators is via liquid line 106.

Note that conduits 86 and 110 which provide connection to reheat condenser 74, positioned in the cold, dehumidified airstream 52 from evaporator 24, are simply connected together via internal passages 102 in valve 72, 92 in valve 66 and connecting conduit 86. Clearly there can be no flow into or out of reheat coil 74 while the 4-way valves are in the A—A mode and the coil 74 is ineffective as a reheat coil. Though no control system is shown, a temperature control having a sensor positioned in airstream 54 could function to determine whether or not reheat is required. Where no reheat is required, the two 4-way valves are set in their "A" positions.

Figure 2:
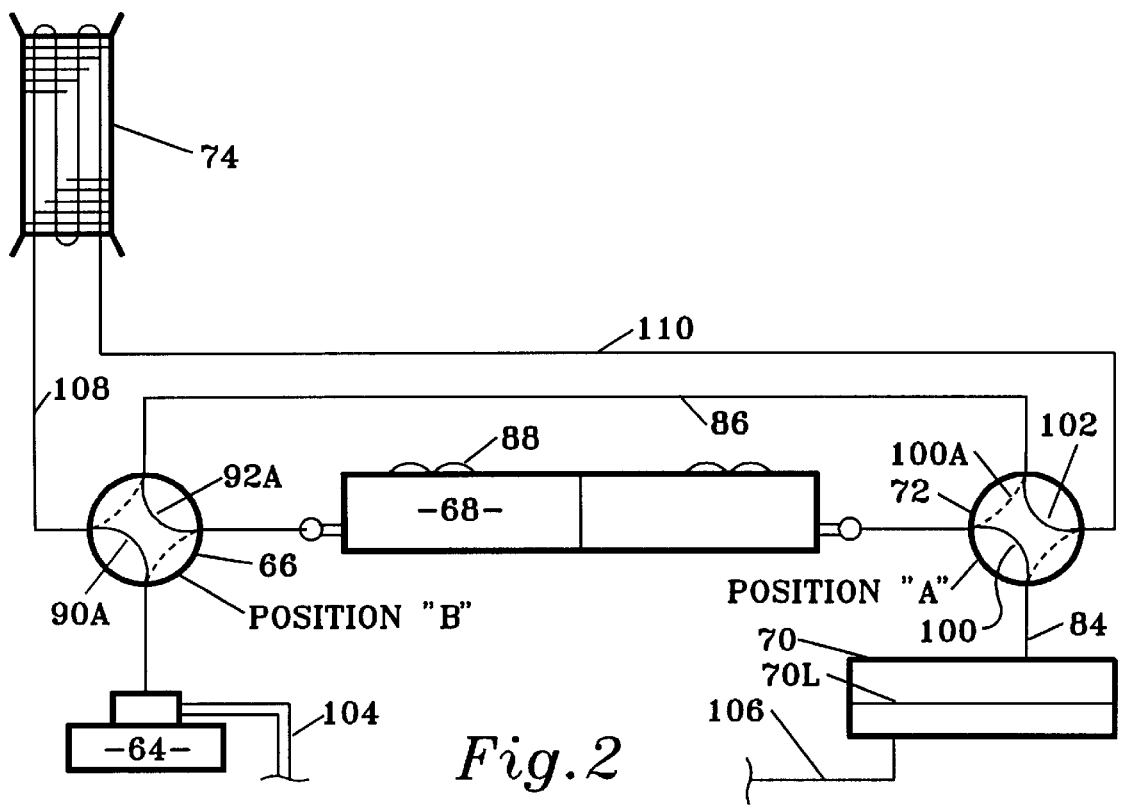
FIGS. 2 and 3 are schematic representations of a portion of the primary refrigeration system of FIG. 1, illustrating the alternate positions of the controlling 4-way valves.

Referring now to FIG. 2 in conjunction with FIG. 1, there is shown the same main system of FIG. 1 employing compressor 64, condenser 68, reheat coil 74 and 4-way valves 66 and 72. In FIG. 2 the discharge 4-way valve 66 has been rotated to its "B" position while liquid 4-way valve 72 has been left in its "A" position.

Now discharge vapor from compressor 64 flows to reheat coil 74 by way of internal passage 90A in discharge 4-way valve 66. Within reheat coil 74 the discharge gas, being exposed to the cold air 52 (refer to FIG. 1) leaving cooling coil 24 causes the refrigerant vapor flowing within reheat coil 74 to condense to a liquid refrigerant. In so doing the refrigerant vapor gives up its heat of condensation and thereby heats (or reheats) the cold airstream 52 entering it to the warmed yet dry outlet condition of the airstream 54.

The liquid refrigerant and any uncondensed refrigerant vapor remaining, not having been condensed in reheat coil 74 is conveyed via conduit 110, passage 102 within liquid 4-way valve 72 (still in position "A"), through connecting conduit 86, through internal passage 92A within discharge 4-way valve 66 and into main condenser 68 where the remainder of the uncondensed refrigerant from reheat coil 74 is condensed and the liquid conveyed by passage 100 within liquid 4-way valve (still in position "A") directly to receiver 70.

Figure 3:
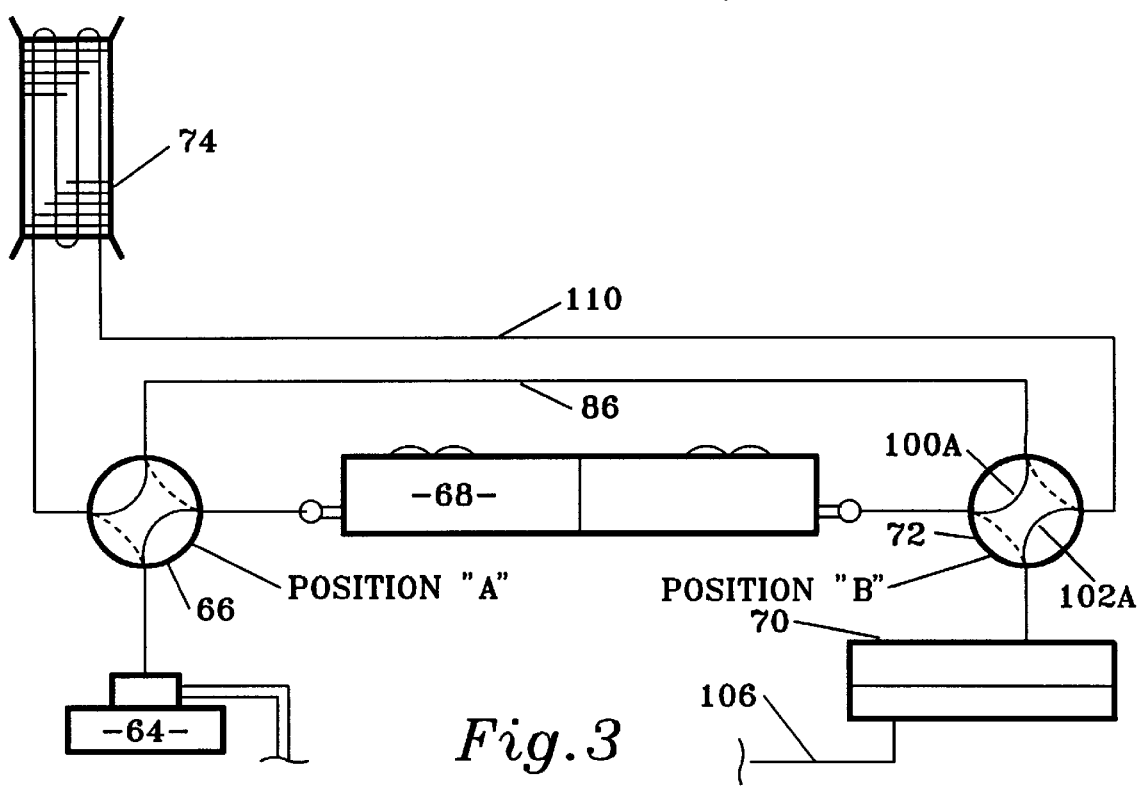

In FIG. 3 the discharge 4-way valve 66 returns to position A and the liquid 4-way valve 72 changes to position B. With this valve arrangement, discharge gas from compressor 64 flows direct to main condenser 68. then via passages in both the liquid and the discharge 4-way valves to reheat condenser 74, then as fully condensed and subcooled liquid refrigerant, back to receiver 70 by way of conduit 110 and passage 102A in liquid 4-way valve 72.

Returning now to FIG. 1, the operating and energy saving performance of the reversible air conditioning system having compressor 22 will be explained under winter conditions.

Under winter conditions 4-way valve 28 will have its internal passages arranged so that flow will occur through dotted passages identified as 33A and 35A. The compressor 22 discharges its compressed refrigerant vapor into discharge line 30; then through internal passage 33A of 4-way valve 28; then into coil 24. In this winter mode, coil 24 acts as a heating coil/condenser for compressor 22. Coil 24 is traversed by cold outdoor air 48/50 provided by fan 46. The cold air condenses the refrigerant vapor pumped to coil 24 via 4-way valve 28 in its winter mode. In so doing, the cold air is thereby heated. The air, now warmed by coil 24 acting as condenser, can be further heated by proper positioning of the 4-way valves connected to main system compressor 64.

In the heating modes the refrigerant liquid, produced in coil 24 by the condensing refrigerant vapor, flows to expansion valve 38 via check valve 44 (expansion valve 40 and check valve 42 not allowing reverse flow). Expansion valve 38 reduces the pressure and temperature of the liquid refrigerant produced in coil 25 and thereby acts to cool the exhaust isle air 47/49, and by cooling the air abstracts its heat which is transferred to the cold outdoor air 48/50 to warm it.

While relatively warm (65 F.) indoor air is being removed by fan 61, heat pipe assembly 62 is transferring heat from the warm airstream 47 to the cold OF entering outdoor airstream 48. Employing the same heat transfer characteristics recited in connection with operation of the heat pipe exchanger 62 under summer conditions, we find that the 65 F. air flowing out of the building is cooled to 43 F. and the 0 F. outdoor is warmed to 22 F. This is a heat recovery Of 23,900 Btu/hr equivalent to the burning of 28 cu. ft. per hour of natural gas at 80 percent efficiency, or 7000 watts of electrical resistance heat, a significant saving.

It should be noted that a compressor labeled 22A is positioned in the airstream 51 which is discharged from condenser coil 26. Such a location for any compressor provides an important operational advantage. Compressor 22A may be the compressor actuating the instant heat pump or it may be one of many compressors which provide cooling for the entire supermarket. The usual design of compressor rooms provides outside ventilation only. The use of the discharge airstream for ventilating one or more compressors, assures substantially constant, relatively low humidity conditions in the compressor room, thereby minimizing sweating and dripping of cold lines and reduction or elimination of corrosion, while simultaneously providing a relatively comfortable working conditions for the service personnel.

From the foregoing description, it can be seen that the present invention comprises a novel heat recovery air conditioning system which, through the use of a heat pipe heat exchanger functions as an extremely effective dehumidifier and further utilizes heat energy from the market or store main refrigerating system to further heat, or reheat, the dehumidified air for return to the store isles, whereby the shoppers enjoy a comfortable environment conducive to prolonged shopping and the open refrigerated cases enjoy a dry atmosphere which sharply prolongs the intervals between required defrosts. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims.

I claim:

1. Ventilating means for removing cold air from a cold location and replacing it with warmed dehumidified air, said means comprising:

a first refrigerating system having an evaporator and a condenser, said evaporator having an air entering side and an air leaving side and said condenser having an air entering side and an air leaving side, a first airstream traversing said evaporator from its air entering side to its air leaving side, said airstream having an outdoor source, whereby said outdoor air is cooled and dehumidified, a second airstream traversing the condenser from its air entering side to its air leaving side, said airstream having its source at the cold location, and heat exchange means separate from said evaporator and said condenser for exchanging heat between the first airstream at a location substantially adjacent the evaporator air entering side and the second airstream at a location substantially adjacent the condenser air entering side, whereby the first airstream is precooled prior to entering the evaporator, thereby increasing the cooling and dehumidifying effect of the evaporator on said first airstream and causing the first evaporator to discharge said first airstream in a cold dehumidified condition on its air leaving side, and the second airstream is preheated prior to entering the condenser, and further providing;

a second refrigerating system having a primary condenser, said primary condenser having an inlet and an outlet, and secondary condenser means connected to said second refrigerating system, said secondary condenser means positioned in the first airstream on the air leaving side of the evaporator.

2. Ventilating means as described in claim 1 further providing means for connecting the secondary condenser means in a first mode in series with the primary condenser inlet, for uncondensed refrigerant flow to the secondary condenser, or in a second mode in series with the primary condenser outlet, for condensed refrigerant flow to the secondary condenser, whereby in either the first or the second mode the cold dehumidified air leaving the evaporator is warmed by said secondary condenser means, thereby providing warmed dehumidified outdoor air to the cold location, or in a third mode in which the secondary condenser receives no flow.

3. Ventilating means as recited in claim 2 where the heat exchange means comprises a heat pipe assembly.

4. Ventilating means as recited in claim 1 where the heat exchange means comprises a heat pipe assembly.

5. Ventilating means as recited in claim 3 further providing that said first refrigeration system has a heating mode and a cooling mode wherein the heating mode the condenser is caused to function as an evaporator and the evaporator is caused to function as a condenser while retaining the same airstream sources.

6. Ventilating means as recited in claim 5 further providing that the heat pipe assembly includes a first end and a second end and further providing means for raising the heat exchanger first end with respect to the second end at one time and for lowering the first heat exchanger end with respect to the second end at another time.

7. Ventilating means as recited in claim 5 further providing a grade level and that the first and second airstreams flow through conduits positioned above the grade level.

8. A cold air removal and make-up air system for a space comprising first conduit means for withdrawing cold air from the space, second conduit means for supplying fresh outdoor make-up air to the space;

first refrigerating system means for removing heat from the make-up air and supplying heat to the cold air from the space, the first refrigerating system means having a refrigerant condenser positioned in the first conduit means and a refrigerant evaporator positioned in the second conduit means, whereby the make-up air is cooled and dehumidified, and heat pipe means for exchanging heat between the make-up air and the cold air from the space whereby the cold air is warmed prior to its entry into the condenser and the make-up air is cooled prior to its entry into the evaporator, and further providing a second refrigerating system having a compressor, a primary condenser having an inlet and an outlet and having secondary condenser means for heating the cooled and dehumidified make-up air.

9. An air make-up system as described in claim 8 further providing means for connecting the secondary condenser means in a first mode in series with the primary condenser inlet for uncondensed refrigerant flow to the secondary condenser and in a second mode in series with the primary condenser outlet for condensed refrigerant flow to the secondary condenser, whereby in either the first or the second mode the cold dehumidified air leaving the evaporator is warmed by said secondary condenser means, thereby providing warmed dehumidified outdoor air to the cold location.

10. An air make-up system as described in claim 8 further providing a grade level and that the first and second conduit means are located above the grade level.

11. A cold air removal and make-up air system for a market space comprising first conduit means for withdrawing cold air from the space, second conduit means for supplying fresh outdoor make-up air to the space;

reversible refrigerating system means for removing heat from one conduit means and supplying heat to the other conduit means, the reversible system having a cooling mode wherein the reversible system cools and dehumidifies the make-up air and heats the cold air from the space, and a heating mode wherein the reversible system further cools the air from the space and heats the make-up air, and heat transfer means separate from the reversible refrigerating system for transferring heat from the warmer of the air in either conduit means to the air in the other conduit means, and further providing a second refrigerating system having a primary condenser having an inlet and an outlet and having secondary condenser means for heating the cooled and dehumidified make-up air.

12. An air make-up system as described in claim 11 further providing means for connecting the secondary condenser means in a first mode in series with the primary condenser inlet for uncondensed refrigerant flow to the secondary condenser and in a second mode in series with the primary condenser outlet for condensed refrigerant flow to the secondary condenser, whereby in either the first or the second mode the cold dehumidified air leaving the evaporator is warmed by said secondary condenser means, thereby providing warmed dehumidified outdoor air to the cold location.

13. An air make-up system as described in claim 12 further providing a grade level and that the first and second conduit means are located above the grade level.

14. An air make-up system as described in claim 13 further providing that the compressor for the second refrigerating system is positioned subject to the heated cold air from the space.

* * * * *